United States Patent [19]
Bek

[11] Patent Number: 5,879,265
[45] Date of Patent: Mar. 9, 1999

[54] APPARATUS AND METHOD FOR DRIVING A VEHICLE WITH A PLURALITY OF MOTORS

[75] Inventor: Manfred Bek, Heidenheim, Germany

[73] Assignee: Voith Turbo GmbH & Co. KG, Heidenheim, Germany

[21] Appl. No.: 856,107

[22] Filed: May 14, 1997

[30] Foreign Application Priority Data

May 14, 1996 [DE] Germany ................. 196 19 321.4

[51] Int. Cl.⁶ .................................................. B62D 11/02
[52] U.S. Cl. ......................... 477/1; 180/65.6; 180/65.7; 180/65.8; 477/3
[58] Field of Search ................ 180/65.1, 65.6, 180/65.7, 65.8; 477/1, 3, 15, 20; 701/22, 58, 60, 61, 62

[56] References Cited

U.S. PATENT DOCUMENTS

| | | | |
|---|---|---|---|
| 4,096,418 | 6/1978 | Marumoto et al. | 180/65.8 |
| 4,174,645 | 11/1979 | Ohmae et al. | 180/65.8 |
| 4,766,967 | 8/1988 | Slicker et al. | 180/65.8 |
| 5,051,641 | 9/1991 | Weh | 310/163 |
| 5,287,772 | 2/1994 | Aoki et al. | 477/15 |
| 5,355,749 | 10/1994 | Obara et al. | 477/20 |
| 5,655,990 | 8/1997 | Ooyama et al. | 477/15 |

FOREIGN PATENT DOCUMENTS

| | | |
|---|---|---|
| 1 655 194 | 7/1971 | Germany . |
| 39 27 453 | 2/1991 | Germany . |
| 42 43 394 | 6/1993 | Germany . |

OTHER PUBLICATIONS

Dubbel, *Taschenbuch für den Maschinenbau* (1996), pp. G63–G195.
Von Hans Kahlen, "Antriebe mit Schaltgetriebe für Elektrotransporter," *BBC–Nachrichten*, Heft 12, pp. 527–532 (1977).
Wüst et al., "Ein elektrischer Einzelradantrieb für City–Busse der Zukunft," *Technik*, pp. 2–8 (Jun. 1994).
"Der Linienbus des Jahres 1995," *Technik*, pp. 12–14 (Jul. 1995).
"Drive systems with Permanent magnet synchronous motors," *Automotive Engineering*, pp. 75–81 (Feb. 1995).
Abstract of German Publication No. 1 655 194 obtained from Derwent Word Patent Index.
Abstract of German Publication No. 39 27 453 obtained from Derwent Word Patent Index.
Geppert, AC Propulsion System For An Electric Vehicle, IEEE Conference on Transportation Electronics, pp. 1–7 Sep. 1980.

*Primary Examiner*—Brian L. Johnson
*Assistant Examiner*—William R. Zimmerli
*Attorney, Agent, or Firm*—Marshall, O'Toole, Gerstein, Murray & Borun

[57] ABSTRACT

A method and apparatus for the operation of a vehicle with a plurality of electric motors includes an electric motor assigned to each wheel of an axle of the vehicle. Attached to each of the electric motors is a shiftable transmission (at least two-speeds). Shifting of a transmission is performed as a function of the total efficiency of the particular motor when reaching a predetermined shifting point. The transmissions attached to the electric motors are shifted, delayed in time. The shifting of the transmission attached to a first electric motor is monitored and the shifting of a transmission attached to a second motor is performed only when the shifting of the first transmission is completed. No interruption of the traction force occurs in the drive system.

15 Claims, 2 Drawing Sheets

APPARATUS AND METHOD FOR DRIVING A VEHICLE WITH A PLURALITY OF MOTORS

BACKGROUND OF THE INVENTION

1. Field of the Invention

The invention concerns apparatus and methods for driving a vehicle utilizing a plurality of motors, and in particular to such apparatus and methods wherein an electrical motor is assigned to a switchable transmission and to a wheel of an axle of a vehicle.

2. Description of Related Technology

Electrical motors find increasing application today for driving vehicles, especially for driving utility vehicles in street traffic (see, for example, Wüst, B., Müller, R., and Lange, A., "An Electrical Single-Wheel Drive for the City Buses of the Future," DER NAHVERKEHR, 6/1994, Alba Fachverlag, Duisseldorf).

Electric motors have operating regions with very good efficiency and other operating regions with lower efficiency. When electrical motors, such as those described in the above article, are used in vehicles, the drive system is generally designed so that the majority of the operation takes place in the motor operating regions exhibiting an optimum efficiency. However, due to necessary rpm regions, operation in regions of lower efficiency cannot be avoided. Therefore, in various individual applications, a transmission is attached to the electric motor.

A disadvantage of some transmissions is the occurrence of an interruption of the traction force during switching (i.e. shifting gears), for example, when a claw gear is utilized. In some applications, in order to avoid such an interruption of the traction force, a more expensive transmission may be used, for example, a planetary gear with lamellar coupling or lamellar brake.

Due to an interruption of the traction force during the gear shifting or switching process, drive systems for street vehicles have utilized wheel gears with constant transmission (see, e.g., Wüst, B., Müller, R., and Lange, A., "An Electrical Single-Wheel Drive for the City Buses of the Future," DER NAHVERKEHR, 6/1994, Alba Fachverlag, Düsseldorf).

Furthermore, automatic or automatically shiftable transmissions of the state of the art have not been used with electronic drives because of overly high energy use.

SUMMARY OF THE INVENTION

It is an object of the invention to overcome one or more of the problems described above. It also is an object of the invention to provide a method of driving a vehicle with several driving machines (motors) as well as a control device for a drive system which permits operation of the drive system in the region of optimum efficiency, even in different rpm regions, and to make a requisite traction force constantly available.

According to apparatus of the invention, a vehicle includes at least first and second electric drive machines (i.e., motors). An electric motor is assigned to a wheel of the vehicle. Attached to the electric motor is a switchable (i.e., shiftable) transmission (at least two-speeds). Shifting of a transmission is performed as a function of the total efficiency of the particular motor when reaching a predetermined shifting point. According to a method of the invention, the transmissions attached to the electric motors are shifted, delayed in time. The shifting process of the transmission attached to a first electric motor is monitored and the shifting of a transmission attached to a second motor is performed only when the shifting of the first transmission is completed. No interruption of the traction force occurs in the drive system.

Other objects and advantages of the invention will be apparent to those skilled in the art from the following detailed description taken in conjunction with the drawings and the appended claims.

DETAILED DESCRIPTION OF THE INVENTION

Figure 1:
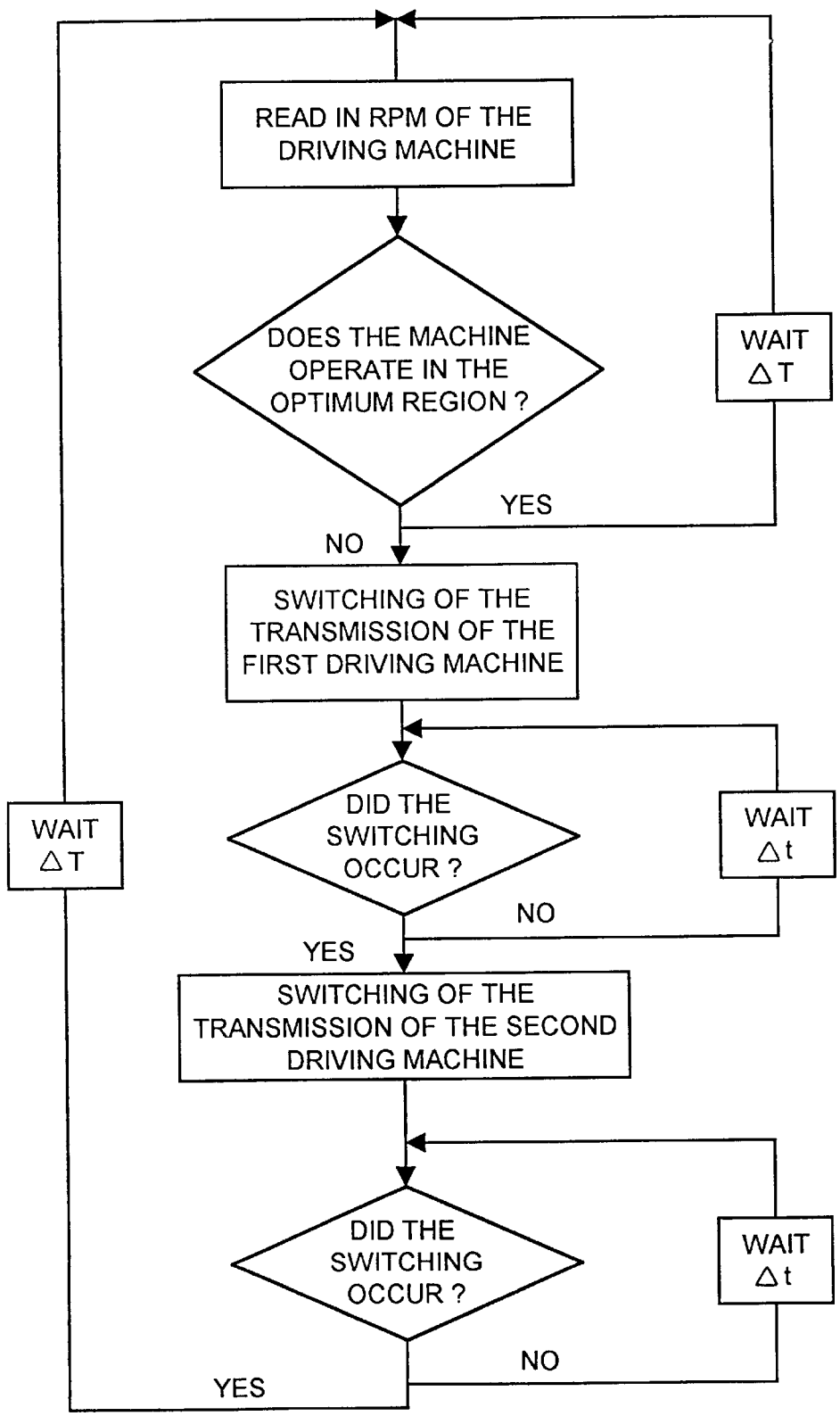
FIG. 1 is a flow chart of a method according to the invention.

According to the invention, a vehicle includes a plurality of drive machines (hereafter most often referred to as motors), preferably electric, each of which drives a wheel or an axle, by attaching to each of the motors a synchronized or un-synchronized multi-step (i.e., multi-speed) transmission which transforms the regions of optimum efficiency to other driving speed values. Such transmissions are controlled according to a method of the invention and with the control device according to the invention, in such a way that only a brief reduction of traction force or no interruption of the traction force occurs during gear shifting. For this purpose, according to a method of the invention, when the switching point (i.e., gear shifting point) is reached, the attached transmissions are switched (i.e., shifted) with a delay, so that interruption of the traction force does not occur.

Also according to the invention, a control device is provided for controlling the travel of a vehicle, designed so that the control device has a first memory region into which the rpm is read and the total efficiency of the motor is determined with the aid of a field of characteristics. The control device is connected to a first transmission attached to a first motor through a first switching line in such a way that when a switching (i.e., shifting) point is reached, a switching pulse is transmitted through the switching line to switch the first transmission. The control device also is connected to a second transmission attached to a second motor through a second switching line in such a way that a switching pulse is applied to the second transmission, to switch the transmission, after the switching of the first transmission is completed.

In a preferred embodiment of an apparatus according to the invention, the apparatus includes at least one electric motor, preferably a transverse flux machine. Such machines are described, for example, in German Patent 39 27 453.

In an embodiment of the invention, the motors may be assigned to each wheel of each axle, or only to a particular wheel or axle. Corresponding to the arrangement of the motors, in an embodiment of the invention, it is possible that, first, the transmission of the motor acting on the front axle is switched, and then the transmission which acts on the back axle, and vice versa.

If a motor is provided for each wheel of an axle, then the following sequences of switching of a transmission are possible: In a first embodiment, first the transmission of the motor assigned to the left wheel (looking in the direction of travel), of the front or back axle is switched. Then, the transmission of the motor assigned to the right wheel of the back or front axle is switched.

It is possible to reverse the procedure described in the previous paragraph. Also, an embodiment according to the invention may be provided wherein a transmission of a motor assigned to the left wheel (looking in the direction of travel) of the front axle is switched first, followed by switching of a transmission of a motor assigned to the right wheel (looking in the direction of travel) of the back axle, or vice versa.

In an especially preferred embodiment according to the invention, the power of a second motor assigned to a second transmission which is not being switched is increased during the switching of a first transmission, in order to compensate for the interruption of the traction force occurring in the first transmission caused by the switching, so that no reduction of traction force occurs at all.

The transmissions used are multi-step (i.e., multi-speed), preferably two-step, transmissions. An especially inexpensive construction can be realized when the transmissions are designed as simple claw gears, which can be either synchronized or un-synchronized. Automatically switching or shiftable transmissions are especially preferred for carrying out the method of the invention.

Figure 2:
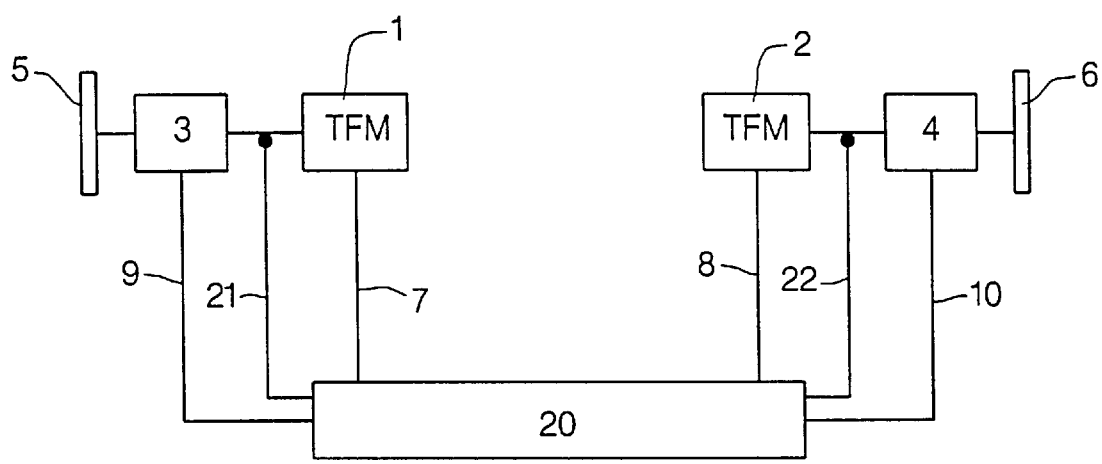
FIG. 2 is a block diagram showing a drive system according to the invention.

FIG. 1 illustrates a flow diagram showing a simple travel control method according to the invention which does not provide compensation for any reduced traction force caused by transmission switching (i.e., gear shifting). FIG. 2 is a schematic representation showing a controller according to the invention for travel control for a vehicle with a plurality of motors.

With reference to FIG. 2, according to a method of the invention, it is first determined if the driving machine or motor, such as a electric transverse flux machine (TFM) 1, operates in an optimal range with regard to efficiency. Since the efficiency of electric motors depends substantially on having the motor operate in a specific rpm region, the rpm taken up after the TFM motor is a direct measure of the efficiency of the machine.

Therefore, with respect to the embodiment of the invention shown in FIG. 2, a first step of a method according to the invention is to read the actual rpm value of the TFM 1 into a memory of a control device 20 at periodic intervals $\Delta T$. Then, by comparison with the characteristics stored in the control device 20, it is determined if the motor 1 operates in an optimal region with regard to efficiency.

In another embodiment of an apparatus and method according to the invention, other quantities which are characteristic for the efficiency of the electric motor 1 can be included, read in the memory of the control device 20 and compared with the characteristics with regard to optimum efficiency.

With reference to FIG. 1, if, upon inquiry, it is determined that the motor 1 (i.e., driving machine) is operating in an optimum region, then, after a read-in waiting time $\Delta T$, which may range between about 1 milli-second and about 1 second, a new value is read into the controller. If the motor 1 does not operate in the optimum range, then an attached transmission 3 must be switched. In this way, it is possible to transform the range of optimum efficiency of the electric motor 1 to a different driving rpm region. For example, if the transmission 3 is a two-step (i.e., two-speed) transmission, the region of the optimum efficiency can be traversed through twice, as a result of which the total efficiency can be increased.

Since an interruption of traction force occurs during the switching of the transmission 3, especially if the transmission 3 uses simply constructed claw gears which require additional energy only during, switching, according to the invention, the transmissions (shown as 3 and 4 in FIG. 2) assigned to various motors are not switched at the same time, but in succession. In the method according to the invention shown in FIG. 1 (and with reference to FIG. 2), this is achieved by first switching the transmission 3 of the first driving machine or motor 1. Then, it is questioned if the switching was performed (which may be accomplished, for example, by determining the actual rpm value of the motor at periodic time intervals $\Delta t$ as shown in FIG. 1). If the switching has not occurred after a $\Delta t$, the inquiry is made again. On the other hand, if the switching of the transmission 3 of the first driving machine 1 has occurred, then one proceeds with the switching of the transmission 4 of the second driving machine (i.e., motor) 2.

In another aspect of a method according to the invention, during the switching of the transmission 3 of the first driving machine (i.e., motor) 1, for a short time, the power of the second driving machine (i.e., motor) 2 is increased to the same extent to which the traction force is reduced when the transmission 3 of the motor 1 is switched. By applying such a measure, it is possible to compensate for the traction force reduction during the switching of the transmission 3 by the motor 2 (and any other motors), and thus to compensate for the failure of a driving unit during the switching process. Thus, reduction in the traction force would not occur at all in such a case.

With reference to FIG. 1., when switching the transmission 4 of the second driving machine (i.e., motor) 2, an inquiry is made again whether or not switching has been completed. If the switching of the second motor 2 is also completed, then, after a read-in waiting time of $\Delta T$, the rpm of the motor 1 is read in again and the control process shown in FIG. 1 is repeated.

Different embodiments of apparatus according to the invention may be provided for following the sequence of switching of the transmissions of different motors. However, in all embodiments and methods according to the invention, switching of a next (e.g., second, third, fourth, etc.) transmission occurs only after the switching process of the first transmission is completed. For example, a motor with transmission can be assigned to the front axle and a similar one to the back axle. Then it is possible to first switch the transmission of the motor assigned to the front axle and then to switch the transmission of the back axle or vice versa.

However, it can also be provided that each wheel of an axle has its own motor with an attached transmission. Then the following possibilities exist for the switching sequence: First, the transmission assigned to the left wheel (looking in the direction of travel) of the front axle is switched and then the transmission attached to the motor of the right wheel (looking in the direction of travel) is switched. Then the switching process proceeds at the back axle analogously to that of the front axle. It also is possible to first switch the transmissions of the back axle and then the transmissions of the front axle.

In an especially preferred embodiment, a crossed switching is provided. That is, first, the transmission of a wheel, for example the left wheel (looking in the direction of travel) of the front axle is switched, and then the transmission of the right wheel of the back axle is switched. Switching of the transmissions of the two other driving motors also takes place in a crossed manner. Such a crossover switching has, for example, the advantage that uneven pull of the vehicle is avoided. Based on the examples given so far, the remaining possibilities of sequential switching are apparent to those of skill in the art.

As indicated above, FIG. 2 discloses a travel control device for carrying out a method according to the invention shown in FIG. 1. In FIG. 2, wheels 5 and 6 of an axle, which may be either the front axle or the back axle, are shown with corresponding driving machines (i.e., motors) 1 and 2, respectively, and attached transmissions 3 and 4, respectively.

Transmissions 3 and 4 for use in the invention are multi-step (multi-speed), preferably two-step (two-speed) transmissions, which may be synchronized or un-synchronized. It is especially advantageous to provide two-step claw gears as transmissions (see, e.g., Dubbel, Taschenbuch für den Maschinenbau, 1996, pp. G63 to G195), which have a simple gear structure. Furthermore, such transmissions require additional energy only during switching, as a result of which the loss of efficiency by the transmission itself is very low.

Although other transmissions may be used according to the invention, they may not be as desirable as they may suffer, among other things, from the fact that a constant efficiency loss occurs by the transmission, which naturally reduces the total efficiency of the motors for the vehicle.

Each driving unit according to the invention includes a motor with attached transmission, assigned to a particular wheel. Thus, the transverse flux motor 1 and the attached transmission 3 are assigned to the left wheel 5, looking in a direction of travel. Similarly, the transverse flux motor 2 and the transmission 4 are assigned to the right wheel 6, looking in the same direction of travel. Both the transverse flux motors 1 and 2, as well as the transmissions 3 and 4 are connected through control lines 7, 8, 9, 10, respectively, with the control device 20, which is preferably a microcomputer equipped with corresponding outputs. A measuring line 21 connected to the control device 20 also connects to a line disposed between the transverse flux motor 1 and the transmission 3. A measuring line 22 connected to the control device 20 also connects to a line disposed between the transverse flux motor 2 and the transmission 4. Measurement signals, which are taken from the transverse flux motors 1 and 2 with sensors or pick-ups, are transmitted to the control device 20 through measuring lines 21 and 22, respectively. The pick-ups or sensors can be rpm sensors which measure the instantaneous rpm of the transverse flux motor 1 or 2.

Control signals are transferred to the transverse flux motor 1 or 2 as well as to the attached transmissions 3 or 4, respectively, with the aid of control lines 7, 8, 9, 10. For example, through the control lines 9 and 10, signals can be transmitted to an actuator, which operates (i.e., switches or shifts) the transmissions 3 and 4, respectively. Actuators may be in the form of commercially available magnetic valves, as they are used for transmission control. The control lines 7 and 8, which are connected to the transverse flux motors 1 and 2, respectively, make it possible to control such motors, for example, to increase the power output of the motor 2 briefly, while the transmission 3 of the other motor 1 is switched, so as to compensate for the interruption of traction force.

According to the invention, a method and a device are provided for the first time for the operation of a vehicle with several motors, making it possible to increase the total efficiency, using transmissions of simple construction.

The foregoing detailed description is given for clearness of understanding only, and no unnecessary limitations should be understood therefrom, as modifications within the scope of the invention will be apparent to those skilled in the art.

I claim:

1. A method for the operation of a vehicle having a drive system with at least first and second electric motors, each motor being assigned to a wheel of the vehicle, a first switchable transmission being attached to the first electric motor and a second switchable transmission being attached to the second electric motor, the method comprising:

(a) switching the first transmission, said switching being a function of a total efficiency of the first motor when reaching a predetermined switching point;

(b) monitoring the first transmission during said switching step;

(c) switching the second transmission only when the switching process of the first transmission is completed so that no interruption of tracking force occurs in the entire drive system, said switching of the second transmission being a function of a total efficiency of the second motor when reaching a predetermined switching point.

2. The method of claim 1 wherein each electric motor is a transverse flux motor.

3. The method of claim 1 wherein the vehicle includes a front axle having left and right wheels with respect to a driving direction, the first motor and attached first transmission being assigned to the left wheel, the second motor and attached second transmission being assigned to the right wheel.

4. The method of claim 1 wherein the vehicle includes a front axle having left and right wheels with respect to a driving direction, the first motor and attached first transmission being assigned to the right wheel, the second motor and attached second transmission being assigned to the left wheel.

5. The method of claim 1 wherein the vehicle includes a back axle having left and right wheels with respect to a driving direction, the first motor and attached first transmission being assigned to the left wheel, the second motor and attached second transmission being assigned to the right wheel.

6. The method of claim 1 wherein the vehicle includes a back axle having left and right wheels with respect to a driving direction, the first motor and attached first transmission being assigned to the right wheel, the second motor and attached second transmission being assigned to the left wheel.

7. The method of claim 1 wherein the vehicle includes a front axle and a back axle, each axle having left and right wheels with respect to a driving direction, the first motor and attached first transmission being assigned to the left wheel of the front axle, the second motor and attached second transmission being assigned to the right wheel of the back axle.

8. The method of claim 1 wherein the vehicle includes a front axle and a back axle, each axle having left and right wheels with respect to a driving direction, the first motor and attached first transmission being assigned to the right wheel of the back axle, the second motor and attached second transmission being assigned to the left wheel of the front axle.

9. The method of claim 1 further comprising:

briefly applying a higher load to the second motor during the switching of the first transmission to compensate for any traction force reduction caused by the switching of the first transmission.

10. A vehicle comprising:
a) at least first and second electric motors, the first motor being assigned to a first wheel of the vehicle and the second motor being assigned to a second wheel of the vehicle;
b) a first transmission attached to the first motor and a second transmission attached to the second motor, each transmission having at least a two speeds;
c) at least one rpm sensor assigned to each motor, said sensor for detecting an rpm of the respective motor;
d) a control device connected to each motor and attached transmission, the control device having a memory region into which the rpm of each motor detected by the rpm detector is read in, and a total efficiency of each motor is determined with the aid of a field of characteristics stored in the control device;
e) a first switching line connected to the control device and the first transmission, the control device introducing a switching pulse through the first switching line for switching the first transmission at a switching point; and
f) a second switching line connected to the control device and the second transmission, the control device introducing a switching pulse through the second switching line for switching the second transmission subsequent to the switching of the first transmission.

11. The vehicle of claim 10 wherein each electric motor is a transverse flux motor.

12. The vehicle of claim 10 wherein each of the transmissions are two-speed transmissions.

13. The vehicle of claim 10 wherein each of the transmissions are claw gears.

14. The vehicle of claim 10 wherein each of the transmissions are synchronized.

15. The vehicle of claim 10 wherein each of the transmissions are un-synchronized.

* * * * *